United States Patent [19]
Kato et al.

[11] Patent Number: 4,973,995
[45] Date of Patent: Nov. 27, 1990

[54] CAMERA SYSTEM AND ATTACHMENT LENS WITH INTEGRAL LENS SECTIONS

[75] Inventors: Masatake Kato, Kunitachi; Shohei Takeda, Yokohama, both of Japan

[73] Assignee: Canon Kabushiki Kaisha, Tokyo, Japan

[21] Appl. No.: 402,454

[22] Filed: Sep. 5, 1989

[30] Foreign Application Priority Data
Sep. 6, 1988 [JP] Japan ................................ 63-223906

[51] Int. Cl.⁵ .......................................... G03B 17/48
[52] U.S. Cl. ....................................... 354/79; 354/295
[58] Field of Search ............... 354/286, 295, 219–225, 354/481–483, 76, 79; 358/909

[56] References Cited
U.S. PATENT DOCUMENTS
2,730,024 1/1956 Merrick ............................. 354/295

Primary Examiner—L. T. Hix
Assistant Examiner—David M. Gray
Attorney, Agent, or Firm—Fitzpatrick, Cella, Harper & Scinto

[57] ABSTRACT

An attachment lens and a camera system, comprising an attachment lens adapted to be attached to the subject side of a camera which is equipped with separate optical openings for the photography system, the finder system, the photometry system, and the colorimetry system. The attachment lens includes an optical element which is on the camera side and which is equipped with a plurality of integrally formed sections facing the optical openings of the camera and having different refractive power configurations, thereby allowing the optical systems to be arranged close to each other.

11 Claims, 2 Drawing Sheets

CAMERA SYSTEM AND ATTACHMENT LENS WITH INTEGRAL LENS SECTIONS

BACKGROUND OF THE INVENTION

1. Field of the Invention

This invention relates to an attachment lens, and in particular, to a small-sized attachment lens which serves as a passage not only for the rays used for photography but also various other rays, and to a camera system equipped with such an attachment lens.

2. Description of the Related Art

Heretofore, it has been a well-known practice in small-sized cameras to arrange, in the vicinity of the optical path for the photographic lens, an exterior-finder optical system and a photometric optical metering system. This type of arrangement is advantageous also in an electronic still camera, since, by converting the conventionally used single-lens reflex type into this arrangement, further miniaturization in camera size can be realized It is to be noted in this regard that the nearer the optical axis of each optical system is situated to that of the photographic lens, the more effectively can any parallax be corrected and any vignetting removed.

Ideally, a system in which the photography rays, the viewfinding rays and the photometry rays (and further, in the case of an electronic still camera, the colorimetry rays) are arranged on the same axis, i.e., the TTL system, provides the maximum space efficiency and is most preferable in terms of optical characteristics. However, this is only true with the space efficiency in the camera front section. In the rear section of the camera, the system can involve an even more complicated mechanism and constitute an obstacle to miniaturization, since in the case of the TTL system, it is often necessary for the bundles of rays passing through the photographic lens to branch off according to the purpose for which the camera is used.

In view of this, a non-TTL type arrangement is generally adopted for the exterior-finder optical system, and the exterior-photometric optical system, for example. This is especially the case with inexpensive cameras, overall miniaturization being effected by miniaturizing the individual parts and designing the various sensors as integrated components.

The operation of attaching an attachment lens to a camera system involves the following problems:

The rays useful for photography, viewfinding, photometry and colorimetry diverge as they travel away from the camera front and approach the subject, with the result that the areas through which they pass overlap. As areas farther from the camera are considered, this naturally results in areas through which these rays overlap practically completely.

This is also true with the attachment lens, which is arranged at a position situated somewhat apart from the camera front. That is, the nearer to the subject the attachment lens is situated, it is more likely that the respective passage areas for the different rays of light will overlap.

In the case of a wide angle converter lens, used for widening the view angle of a photography lens, at least two groups of lenses are needed for its construction. One of these groups, situated nearer to the subject, exhibits negative refractive power, and the other exhibits a positive refractive power. Likewise, at least two groups of lenses are needed for the finder optical system i order that it can be used for correcting the view angle of a converted photography lens. This will be referred to as the finder-correction optical system of an attachment lens. As stated above, miniaturization in camera size will result in the lenses in the correction optical system or the lens barrel section frequently interrupting the rays for photography. Conversely, the lens barrel of the photography lens will interrupt the rays of the finder-correction optical system and the photometric optical system, for example.

This problem is attributable to the fact that the individual lenses are independent of each other in terms of function, so that a large amount of space is needed to accommodate them.

SUMMARY OF THE INVENTION

It is an object of this invention to make it possible to attach an attachment lens to a camera system without adversely affecting the rays incident upon the different optical openings, notwithstanding the fact that a plurality of optical openings are arranged close to each other.

In accordance with this invention, the above object is achieved by an attachment lens which is adapted to be attached to the subject side of a principal photography lens in a camera body, and an attachment lens which comprises lens sections respectively having positive and negative refractive powers, wherein the lens section situated nearer to the principal photography lens of the camera body is integrally formed such that it has transmission sections of predetermined configurations with respect to three or more bundles of grouping of rays including photography rays, finder rays, and photometry rays. Further, in the case of an electronic still camera, the three or more bundles will include colorimetry rays, or automatic-range-finding rays. Japanese Utility Model Laid-Open No. 56-102521 discloses some of the related art.

DESCRIPTION OF A PREFERRED EMBODIMENT

Figure 1:
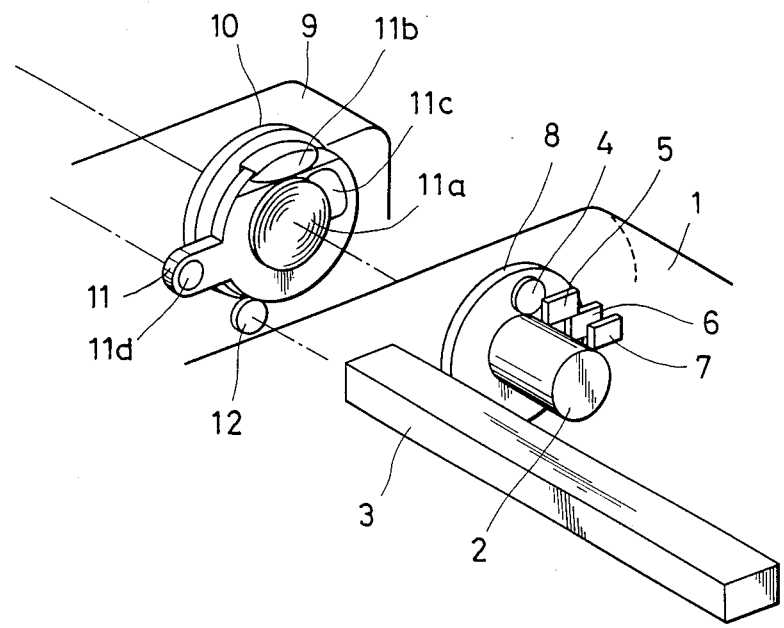
FIG. 1 is a sectional view of a camera system in accordance with an embodiment of this invention.

An embodiment of this invention will now be described with reference to the accompanying drawings.

The embodiment shown includes a camera body 1 (partially shown), a principal photography lens 2 provided in the camera body 1, an external real-image finder unit 3 accommodating a well-known real-image finder optical system, a photometry lens 4, a photometric sensor 5, a colorimetric diffusion plate 6, a colorimetric sensor 7, a protective glass 8 arranged on the front surface of the camera body 1 in such a manner as not to interrupt the rays of these optical systems, and a teleconverter lens unit 9 constituting the attachment lens which is adapted to be attached to the front surface of the camera body 1. The arrangement will be the same if, instead of the teleconverter lens unit 9, a wide angle converter is used. Arranged in the teleconverter lens unit 9, in the same order as seen from the subject to be photographed, are a first lens 10 adapted to transmit the photography lens rays, the photometry rays, and the colorimetry rays and having positive refractive power, and a second lens 11 consisting of a plurality of lens sections having different refractive powers. The second lens 11 comprises, in an integral form, a photography rays transmitting section 11a, a colorimetry rays transmitting section 11b, a photometry rays transmitting section 11c, and a finder-correction optical convex lens section 11d.

Further, a finder-correction optical concave lens 12 is separately provided in the teleconverter lens unit 9.

Figure 2:
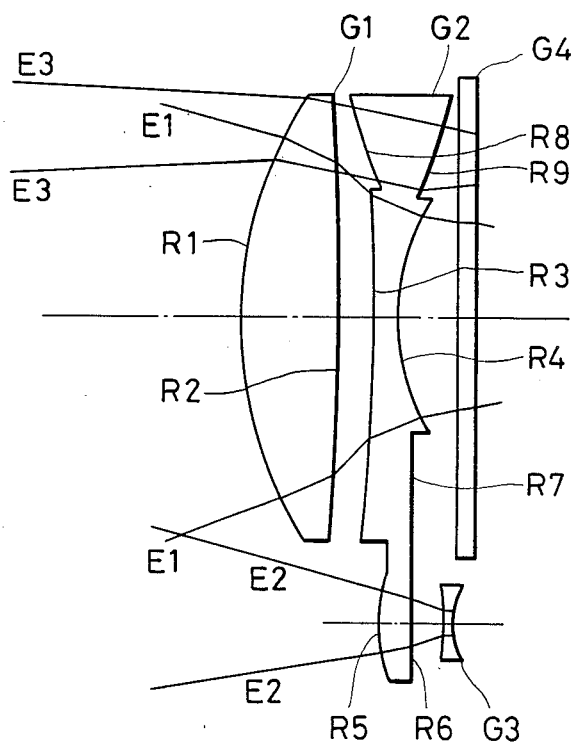
FIG. 2 is a sectional view of an essential part of the optical system thereof.

FIG. 2 is a sectional view showing the optical paths in the teleconverter lens of this embodiment. The teleconverter lens shown is composed of a first lens unit G1 having positive refractive power, a second lens unit G2 comprising a plurality of lens sections, and a finder-correction optical system lens G3. The reference numeral G4 indicates the protective glass on the camera body. The first lens unit G1 covers at least two lens sections of the second lens unit G2.

The rays for photography pass through surfaces R1 and R2 (10) of the first lens unit G1, and surfaces R3 and R4 (11a) constituting the negative lens section of the second lens unit G2. Here, the transmitted rays of light are indicated by El. The finder rays pass through a positive lens formed by surfaces R5 and R6 of the second lens unit G2, and a lens unit G3 (12) having negative refractive power. The transmitted rays of light are indicated by E2. The photometry rays pass through surfaces R1 and R2 of the first lens unit G1 as well as surfaces R8 and R9 (11b) of the second lens unit G2. The transmitted rays of light are (11b) of indicated by E3. The colorimetry rays pass through surfaces R1 and R2 of the first lens unit G1 as well as surfaces R3 and R7 (11c) of the second lens unit G2.

In particular, it is to be noted that, in order that any parallax between the photometry rays and the photography rays may be compensated for, the optical axis of the photometry rays transmitting lens section 11b of the second lens unit G2 is decentered with respect to the optical axis of the photometry-ray-transmitting section of the first lens unit G1. At the same time, a maximum margin width large enough to provide the required surface precision for the integral formation will suffice for the boundary section between the photometry-ray-transmitting section of the lens unit G2 and the photography-ray-transmitting section of the same. In this manner can those sections be arranged close to each other, thereby making it possible to miniaturize the teleconverter unit. Instead of the photometry rays, rays for automatic range finding may be passed.

As described above, the attachment lens in accordance with the present invention, when attached to a camera, makes it possible to impart a predetermined effect to each distinct bundle of rays and to arrange the respective optical systems close to each other, thereby allowing the camera and the attachment lens to be miniaturized.

We claim:

1. A camera system comprising: a camera body including a subject side and at least first and second optical openings; and an attachment lens unit mean having at least first and second built-in lens units that is adapted to be detachably attached to the subject side of said camera body; said first lens unit having a predetermined refractive power, said second lens unit being opposed to said at least first and second optical openings and having a plurality of sections which respectively face each of said optical openings at certain positions, wherein each of said sections has a predetermined different configuration in accordance with the position at which each section faces one of said optical openings.

2. A camera system according to claim 1, wherein the predetermined different configurations of the sections are determined such that each of said plurality of sections exhibits a different refractive power.

3. A camera system according to claim 1, wherein said first lens unit is positioned on the subject side of said second lens unit in such a manner as to cover all of said optical openings.

4. A camera system according to claim 1, wherein said first optical opening is an opening for a photography lens system, and wherein said second optical opening is an opening for a colorimetry system.

5. A camera system according to claim 1, wherein said first optical opening is an opening for a photography lens system and wherein said second optical opening is an opening for a finder system within said camera body.

6. A camera system according to claim 4, wherein said camera body is further equipped with a third optical opening for a photometry system and a fourth optical opening for a finder system within said camera body.

7. A camera system according to claim 1, wherein said second lens unit includes a section having positive refractive power and a section having negative refractive power.

8. A camera system according to claim 7, wherein said first lens unit has positive refractive power.

9. An attachment lens adapted to be detachably attached to a subject side of a camera body that is equipped with at least first and second optical openings, comprising:

a first lens unit having a predetermined refractive power; and a second lens unit that is arranged on the camera body side of said first lens unit and including a plurality of integrally formed sections which have different refractive powers and are arranged in such a manner as to respectively face said optical openings when the attachment lens is attached to said camera body.

10. An attachment lens according to claim 9, wherein said first optical opening is an opening for a photography lens system, said second opening being an opening for a photometry system, wherein a camera body for use with the attachment lens further includes a third optical opening for a colorimetry system and a fourth optical opening for a finder system, and the second lens unit of said attachment lens further includes sections having different refractive powers and each section is arranged at a position that will be opposed to the four optical openings of said camera body.

11. An attachment lens according to claim 9, wherein said first lens unit has positive refractive power.

* * * * *

UNITED STATES PATENT AND TRADEMARK OFFICE
CERTIFICATE OF CORRECTION

PATENT NO. : 4,973,995

DATED : November 27, 1990

INVENTOR(S) : MASATAKE KATO, ET AL.

It is certified that error appears in the above-identified patent and that said Letters Patent is hereby corrected as shown below:

Column 1:

Line 21, "realized" should read --realized.--

Line 68, "i order" should read --in order--.

Column 3:

Line 28, "(11b) of" should be deleted.

Line 58, "mean" should read --means--.

Signed and Sealed this

Thirtieth Day of June, 1992

Attest:

DOUGLAS B. COMER

*Attesting Officer*    *Acting Commissioner of Patents and Trademarks*